US007028292B1

(12) United States Patent
Yokota et al.

(10) Patent No.: US 7,028,292 B1
(45) Date of Patent: Apr. 11, 2006

(54) PROGRAM EXECUTING APPARATUS, CONTROL METHOD THEREFOR, AND STORAGE MEDIUM FOR INTERPRETING AND EXECUTING INTERMEDIATE CODES

(75) Inventors: Yasuhiro Yokota, Yokohama (JP); Makoto Minari, Yokohama (JP); Hirokazu Ohi, Machida (JP); Jun Nozaki, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/339,250

(22) Filed: Jun. 24, 1999

(30) Foreign Application Priority Data

Jun. 30, 1998 (JP) ................................ 10/199727

(51) Int. Cl.
G06F 9/45 (2006.01)
(52) U.S. Cl. ...................................... 717/139; 717/136
(58) Field of Classification Search ................ 717/146, 717/118, 140, 141, 148, 151, 159, 161, 136, 717/139, 145
See application file for complete search history.

(56) References Cited

U.S. PATENT DOCUMENTS

| 4,667,290 | A | * | 5/1987 | Goss et al. ..................... 713/1 |
| 5,303,377 | A | * | 4/1994 | Gupta et al. ................. 717/155 |
| 5,367,685 | A | * | 11/1994 | Gosling ....................... 717/116 |
| 5,452,457 | A | * | 9/1995 | Alpert et al. ................ 717/153 |
| 5,577,233 | A | * | 11/1996 | Goettelmann et al. ........ 703/26 |
| 5,713,006 | A | * | 1/1998 | Shigeeda ..................... 711/170 |
| 5,764,883 | A | * | 6/1998 | Satterfield et al. ............ 714/38 |
| 5,983,021 | A | * | 11/1999 | Mitrovic ...................... 717/158 |
| 5,995,754 | A | * | 11/1999 | Holzle et al. ................ 717/158 |
| 6,021,275 | A | * | 2/2000 | Horwat ........................ 717/147 |
| 6,078,744 | A | * | 6/2000 | Wolczko et al. .............. 700/28 |
| 6,110,226 | A | * | 8/2000 | Bothner ....................... 717/153 |
| 6,151,703 | A | * | 11/2000 | Crelier ......................... 717/136 |
| 6,295,561 | B1 | * | 9/2001 | Nagy .......................... 709/246 |
| 6,301,652 | B1 | * | 10/2001 | Prosser et al. .............. 712/204 |
| 6,317,872 | B1 | * | 11/2001 | Gee et al. .................... 707/206 |
| 6,324,685 | B1 | * | 11/2001 | Balassanian ................ 717/118 |
| 6,327,702 | B1 | * | 12/2001 | Sauntry et al. ............. 717/118 |
| 6,370,622 | B1 | * | 4/2002 | Chiou et al. ................. 711/146 |
| 6,904,516 | B1 | * | 6/2005 | Lam ........................... 717/139 |

OTHER PUBLICATIONS

Aho, "Compilers; Principles, Techniques, and Tools"; Addison-Wesley Publishing Company; Reading, MA; 1986.*
Ritchey, "Java!"; New Riders Publishing; Indianapolis, Indiana; 1995.*
McFarling, Scott; "Program Optimization for Instruction Caches"; 1989 ACM; pp. 183-191.*
Hwu et al.; "Achieving High Instruction Cache Performance with an Optimizing Compiler"; 1989 ACM; pp. 242-251.*

* cited by examiner

*Primary Examiner*—Wei Zhen
*Assistant Examiner*—William H. Wood
(74) *Attorney, Agent, or Firm*—Fitzpatrick, Cella, Harper & Scinto

(57) ABSTRACT

In a program executing apparatus, a code reading section reads intermediate codes into a storage unit. A data-reference analyzing section determines whether the operands of instructions in the intermediate codes stored in the storage unit require a data reference. Each data reference is analyzed for instructions requiring the data reference. A code rewriting section rewrites the operands of the instructions according to the analysis information obtained by the data-reference analyzing section. An address updating section updates the addresses of address-related instructions. After all intermediate codes are interpreted, a main interpreting and executing section starts interpreting and executing the intermediate codes.

13 Claims, 8 Drawing Sheets

FIG. 3A

OPERAND REWRITING WITH
MEMORY BOUNDARIES NOT
BEING TAKEN INTO ACCOUNT

BYTE-CODE SEQUENCE 301

| ADDRESS | |
|---|---|
| | .... |
| 100 | LOAD_CHAR |
| 101 | 10 |
| 102 | LOAD_INT |
| 103 | 00 |
| 104 | 00 |
| 105 | 00 |
| 106 | 30 |
| | ... |

FIG. 3B

OPERAND REWRITING WITH
MEMORY BOUNDARIES
BEING TAKEN INTO ACCOUNT
(BIG ENDIAN)

BYTE-CODE SEQUENCE 302

| ADDRESS | |
|---|---|
| | .... |
| 100 | LOAD_CHAR |
| 101 | 10 |
| 102 | NOP |
| 103 | LOAD_INT |
| 104 | 00 |
| 105 | 00 |
| 106 | 00 |
| 107 | 30 |
| | ... |

FOUR-BYTE BOUNDARY

FIG. 3C

OPERAND REWRITING WITH
MEMORY BOUNDARIES
BEING TAKEN INTO ACCOUNT
(LITTLE ENDIAN)

BYTE-CODE SEQUENCE 303

| ADDRESS | |
|---|---|
| | .... |
| 100 | LOAD_CHAR |
| 101 | 10 |
| 102 | NOP |
| 103 | LOAD_INT |
| 104 | 30 |
| 105 | 00 |
| 106 | 00 |
| 107 | 00 |
| | ... |

FOUR-BYTE BOUNDARY

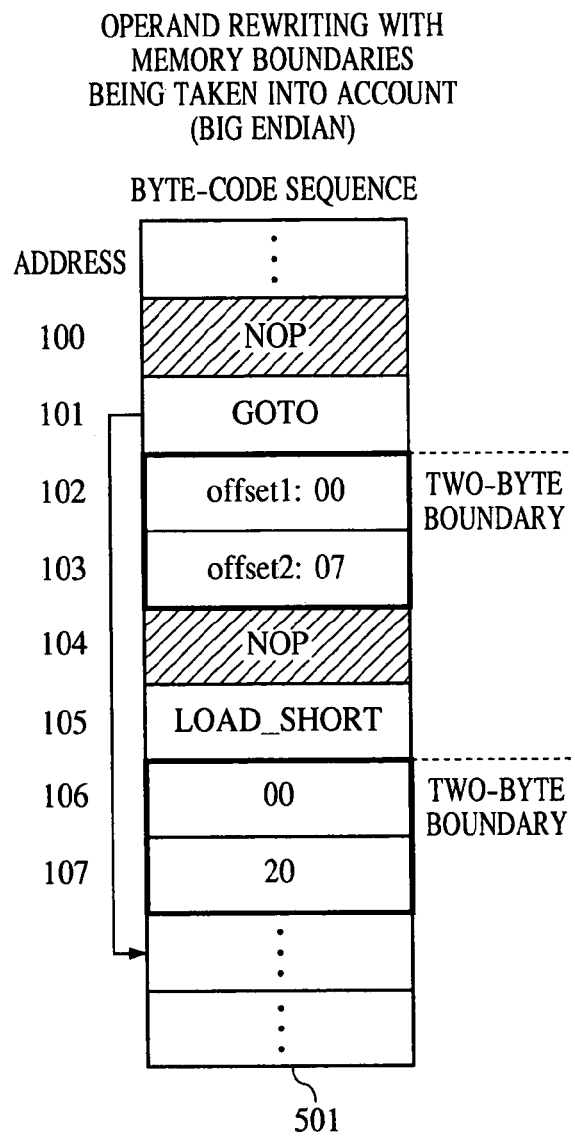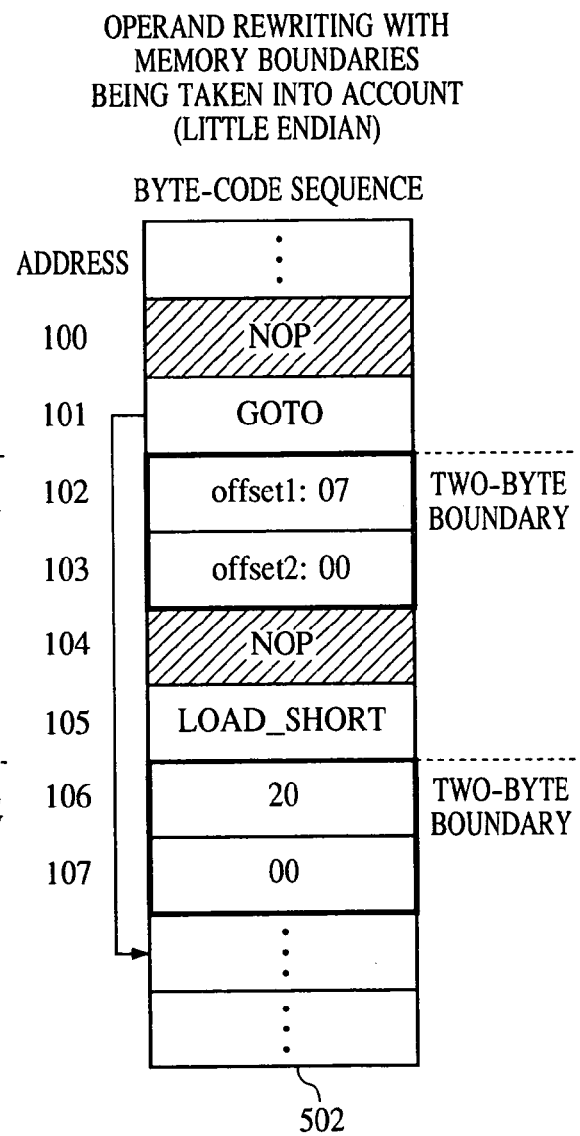

PROGRAM EXECUTING APPARATUS, CONTROL METHOD THEREFOR, AND STORAGE MEDIUM FOR INTERPRETING AND EXECUTING INTERMEDIATE CODES

BACKGROUND OF THE INVENTION

1. Field of the Invention

The present invention relates to interpreter-type program executing apparatuses, control methods therefor, and storage media therefor which interpret and execute intermediate codes generated by a compiler.

2. Description of the Related Art

In conventional interpreter-type program executing apparatuses which interpret and execute intermediate codes generated by a compiler, an interpreter repeatedly interprets and executes intermediate codes statement by statement to execute the program. As an interpreter that performs this processing, there is known a byte-code interpreter which interprets and executes byte codes. This byte-code interpreter and byte codes attract special attention in a recent Internet age. This is because a program formed of byte codes downloaded from the Internet is independent of a platform and is executed in computers having various architectures just with a byte-code interpreter.

In conventional program executing apparatuses, however, when an instruction operand needs a data reference in a process in which an interpreter interprets and executes intermediate codes statement by statement, an executing speed is very slow since the data reference has to be analyzed and executed.

To reference data as fast as possible, a hash table for analyzing the data reference or a memory area for data cache can be provided. Either of these methods, however, increases the required memory capacity.

SUMMARY OF THE INVENTION

Accordingly, it is an object of the present invention to provide a program executing apparatus, a control method therefor, and a storage medium therefor in which an interpreter that interprets and executes one by one intermediate codes generated by a compiler analyzes all instructions that include a data reference in a stage where the intermediate codes are read into a memory and re-writes the intermediate codes according to the analysis information to allow the intermediate codes to be executed at a high speed.

Another object is to provide a program executing apparatus, a control method therefor, and a storage medium therefor in which intermediate codes are rewritten according to the information of analyzed data reference with a data arrangement appropriate for a machine architecture taken into account to reduce the number of memory accesses as much as possible, and thereby the intermediate codes are allowed to be executed at a high speed.

Yet another object is to provide a program executing apparatus, a control method therefor, and a storage medium therefor in which data references are all analyzed in advance and intermediate codes are rewritten in advance according to the analysis information to eliminate a hash table for data reference analysis and a memory area for data cache, and thereby the required memory capacity is allowed to be reduced.

At least one of the foregoing objects is achieved in one aspect of the present invention through the provision of a program executing apparatus of interpreter type for interpreting and executing one by one intermediate codes generated by a compiler, including: code reading means for reading intermediate codes into a storage unit; data-reference analyzing means for analyzing the data reference of the intermediate codes read into the storage unit; code rewriting means for rewriting the intermediate codes stored in the storage unit, according to the analysis information; and address updating means for updating the addresses of the intermediate codes when the size of the intermediate codes is changed due to rewriting performed by the code rewriting means.

At least one of the foregoing objects is achieved in another aspect of the present invention through the provision of a control method for a program executing apparatus of interpreter type for interpreting and executing one by one intermediate codes generated by a compiler, including: a code reading step of reading intermediate codes into a storage unit; a data-reference analyzing step of analyzing the data reference of the intermediate codes read into the storage unit; a code rewriting step of rewriting the intermediate codes stored in the storage unit, according to the analysis information; and an address updating step of updating the addresses of the intermediate codes when the size of the intermediate codes is changed due to rewriting performed in the code rewriting step.

At least one of the foregoing objects is achieved in yet another aspect of the present invention through the provision of a storage medium for storing program codes executed by a program executing apparatus of interpreter type for interpreting and executing one by one intermediate codes generated by a compiler, the program codes including: a code reading procedure of reading intermediate codes into a storage unit; a data-reference analyzing procedure of analyzing the data reference of the intermediate codes read into the storage unit; a code rewriting procedure of rewriting the intermediate codes stored in the storage unit, according to the analysis information; and an address updating procedure of updating the addresses of the intermediate codes when the size of the intermediate codes is changed due to rewriting performed in the code rewriting procedure.

BRIEF DESCRIPTION OF THE DRAWINGS

FIG. 3, formed of FIG. 3A, FIG. 3B, and FIG. 3C, is a view showing how a data-reference analyzing section 104, a code rewriting section 105, and an address updating section 106 interpret and change a byte-code sequence shown in FIG. 2.

FIG. 5, formed of FIG. 5A and FIG. 5B, is a view showing how the data-reference analyzing section 104, the code rewriting section 105, and the address updating section 106 interpret and change a byte-code sequence shown in FIG. 4.

DESCRIPTION OF THE PREFERRED EMBODIMENTS

Program executing apparatuses, control methods therefor, and storage media therefore according to embodiments of the present invention will be described below.

First Embodiment

Figure 1:
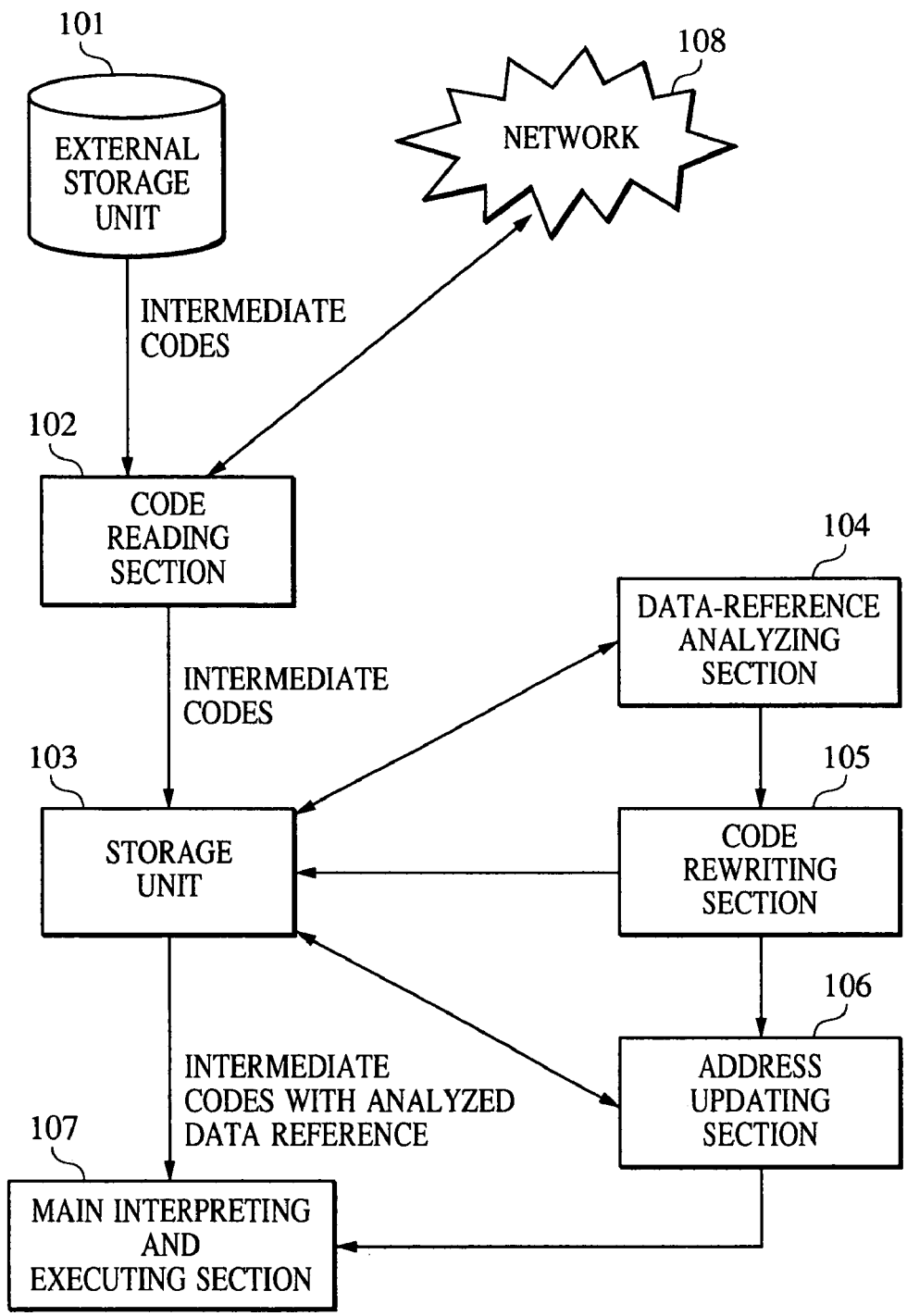
FIG. 1 is a block diagram showing a functional structure of a program executing apparatus according to a first embodiment.

FIG. 1 is a block diagram showing a functional structure of a program executing apparatus according to a first embodiment of the present invention. In FIG. 1, an external storage unit 101 includes a storage medium such as a hard disk or a magneto-optical disk and stores various intermediate codes read by an interpreter.

A code reading section 102 reads intermediate codes from the external storage unit 101 or through a network 108, and stores them in a storage unit 103 such as a RAM.

The storage unit 103 stores the intermediate codes which the code reading section 102 reads from the external storage unit 101 or through the network 108, and is also used for execution of the intermediate codes.

There are also shown a data-reference analyzing section 104, a code rewriting section 105, an address updating section 106, and a main interpreting and executing section 107.

The network 108 is used for downloading intermediate codes.

The code reading section 102, the data-reference analyzing section 104, the code rewriting section 105, the address updating section 106, and the main interpreting and executing section 107 are implemented when a central processing unit (CPU) not shown of the program executing apparatus executes program codes (described later) stored in the storage unit 103.

In the program executing apparatus having the above structure, intermediate codes stored in the external storage unit 101 or those downloaded through the network 108 are read by the code reading section 102 into the storage unit 103.

The data-reference analyzing section 104 determines whether the operands of instructions included in all the intermediate codes read into the storage unit 103 need data reference, and analyzes the data reference for instructions having the data reference.

The code rewriting section 105 rewrites instruction operands according to the analysis information obtained by the data-reference analyzing section 104. With a data arrangement method appropriate for the architecture of the operating machine being taken into account, such as the order of big endian or little endian, or the use of four-byte data arrangement boundaries or two byte boundaries, intermediate codes are rewritten.

The address updating section 106 updates the addresses of address-related instructions when the operand size of the data rewritten according to the information of the data reference analyzed by the data-reference analyzing section 104 becomes larger than the original operand size, or when the operand size becomes larger than the original operand size due to the data arrangement method used for rewriting instruction operands. After the data-reference analyzing section 104, the code rewriting section 105, and the address updating section 106 interpret all intermediate codes, the main interpreting and executing section 107 starts interpreting and executing the intermediate codes.

Figure 2:
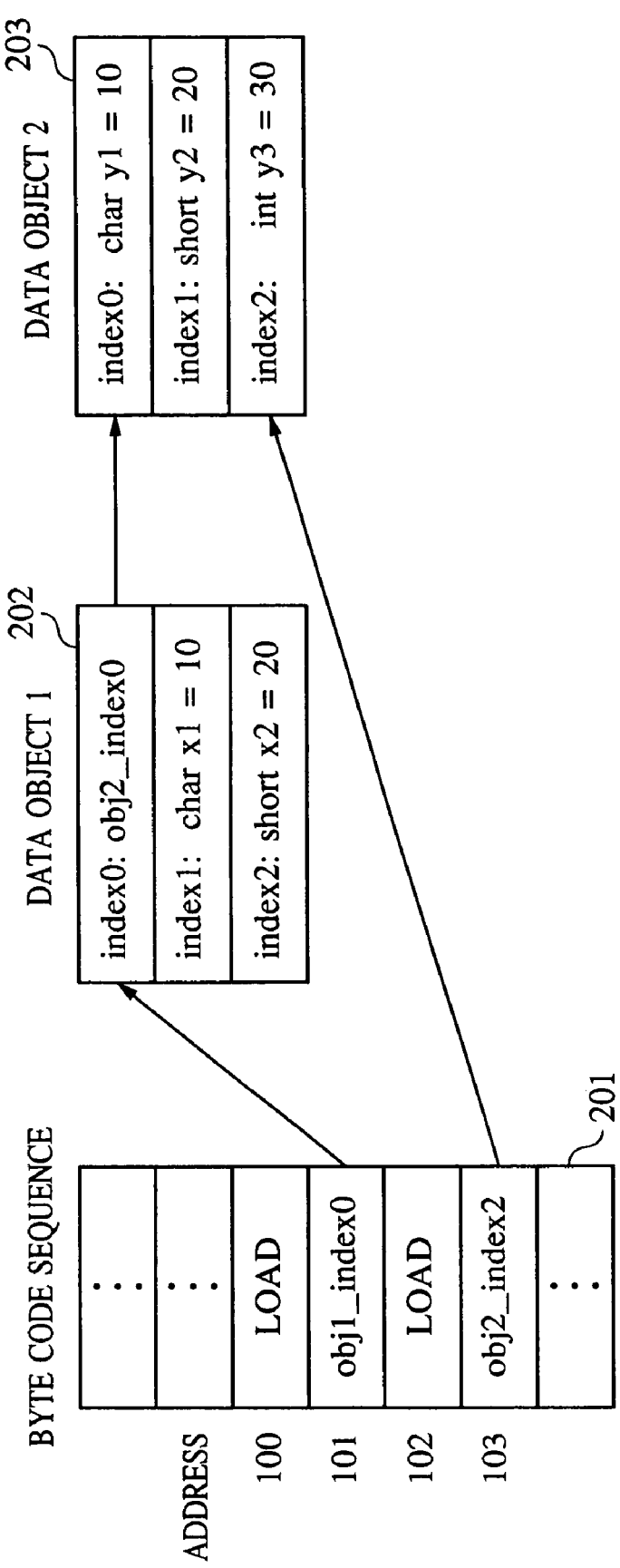
FIG. 2 is a view showing instructions and their operands of intermediate codes read by a code reading section 102.

FIG. 2 is a view showing instructions and their operands of intermediate codes read by the code reading section 102 (a view showing addresses of the storage section 103). In these intermediate codes, the operands have data reference. The intermediate codes are byte codes. In other words, all instructions are one-byte instructions and operands are one byte long. All the byte-code instructions are fetched in units of bytes.

In FIG. 2, in a byte-code sequence 201 read by the code reading section 102, a LOAD instruction is stored at an address of 100, and the operand of the LOAD instruction stored at the address 100, obj1_index0, is stored at an address of 101. This operand, obj1_index0, references index0 of a data object1 described later.

Another LOAD instruction is stored at an address of 102, and the operand of the LOAD instruction stored at an address of 102, obj2_index2, is stored at an address of 103. This operand, obj2_index2, references index2 of a data object2 described later.

The data object1 202 shows data examples referenced by operands of instructions included in the byte-code sequence 201. In index0 of the data object1, an index of obj2_index0, which references the data object2, is stored. A variable x1 having a data type of "char" (one byte long) is set to 10 in index1, and a variable x2 having a data type of "short" (two bytes long) is set to 20 in index2.

The data object2 203 shows data examples referenced by operands of instructions included in the byte-code sequence 201. A variable y1 having a data type of "char" (one byte long) is set to 10 in index0, a variable y2 having a data type of "short" (two bytes long) is set to 20 in index1, and a variable y3 having a data type of "int" (four bytes long) is set to 30 in index2.

FIGS. 3A to 3C are views showing how the data-reference analyzing section 104, the code rewriting section 105, and the address updating section 106 interpret and change the byte-code sequence shown in FIG. 2 (views showing addresses of the storage unit 103).

In FIG. 3A, the data reference of the operands of instructions included in the byte-code sequence is analyzed, and the operands are rewritten according to the analysis with memory boundaries being not taken into account. In this example, since the operand of the LOAD instruction stored at an address of 100 references index0 in the data object2, namely, the data 10 of the variable y1 having a data type of "char" (one byte long), the operand at an address of 101 is changed to the data 10.

At the same time, the LOAD instruction stored at the address 100 is changed to a LOAD_CHAR instruction because the original instruction needs to be changed such that data reference is not performed in actual instruction execution and the operand is one byte long.

In the same way, since the operand of the LOAD instruction stored at the address 102 references index 2 in the data object2, namely, the data 30 of the variable y3 having a data type of "int" (four bytes long), the operand at the address 103 is rewritten into four bytes from the address 103 to an address 106.

At the same time, the LOAD instruction stored at the address 102 is changed to a LOAD_INT instruction because the original instruction needs to be changed such that data reference is not performed in actual instruction execution and the operand is four bytes long.

In FIG. 3B, the data reference of the operands of instructions included in the byte-code sequence is analyzed, and the operands are rewritten according to the analysis in the order specified in a data arrangement method appropriate for the architecture of the operating machine, namely, in the order of big endian. As shown in FIG. 3A, with the LOAD_INT instruction at the address 102, the operand written into the four bytes from the address 103 to the address 106 is accessed. When the CPU accesses data not arranged in four-byte boundaries at a time, an exception may occur and thereby an access speed becomes slower. To avoid this phenomenon, a NOP instruction is inserted at an address of 102, which is immediately before the LOAD_INT instruction, to store the LOAD_INT instruction at the address 103 and its operand in four bytes from an address of 104 to an address of 107.

In FIG. 3C, the data reference of the operands of instructions included in the byte-code sequence is analyzed, and the operands are rewritten in the order of little endian. In the same way as in FIG. 3B, a NOP instruction is inserted at an address of 102, which is immediately before the LOAD_INT instruction, to store the LOAD_INT instruction at the address 103 and its operand in four bytes from an address of 104 to an address of 107.

In FIG. 2 and FIGS. 3A to 3C, the data reference destinations are variables. When a data reference destination is a function, the same processing is performed. In this case, in addition to a LOAD instruction, an instruction which needs to be changed due to operand rewriting is changed to another instruction.

Figure 4:
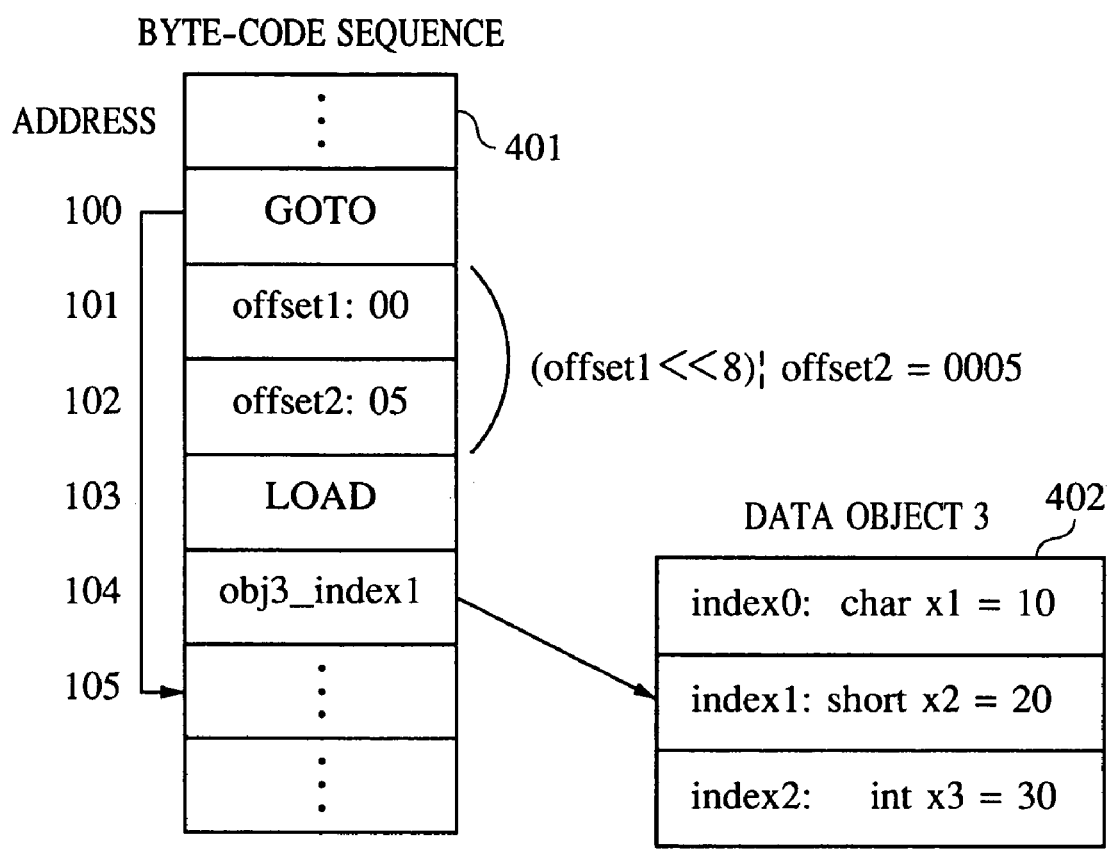
FIG. 4 is a view showing instructions and their operands of intermediate codes read by the code reading section 102.

FIG. 4 is a view showing instructions and their operands of intermediate codes read by the code reading section 102 (a view showing addresses of the storage section 103). In these intermediate codes, some operands include addresses and need data reference as in that of a GOTO instruction.

In FIG. 4, in a byte-code sequence 401 read by the code reading section 102, a GOTO instruction is stored at an address of 100 and the relative addresses serving as the jump destination of the GOTO instruction are stored at addresses of 101 and 102. The value obtained by the calculation of (offset1<<8)|offset2=0005 indicates the relative address of the jump destination of the GOTO instruction, namely, an address of 105. A LOAD instruction is stored at an address of 103, and the operand of the LOAD instruction stored at the address 103, obj3_index1, is stored at an address of 104. This obj3_index1 references index1 of a data object3, described later.

The data object3 402 shows data examples referenced by operands of instructions included in the byte-code sequence 401. A variable x1 having a data type of "char" (one byte long) is set to 10 in index0, a variable x2 having a data type of "short" (two bytes long) is set to 20 in index1, and a variable x3 having a data type of "int" (four bytes long) is set to 30 in index2.

FIGS. 5A and 5B are views showing how the data-reference analyzing section 104, the code rewriting section 105, and the address updating section 106 interpret and change the byte-code sequence shown in FIG. 4 (views showing addresses of the storage unit 103).

In FIG. 5A, the data reference of the operands of instructions included in the byte-code sequence is analyzed, and the operands are rewritten according to the analysis in the order specified in a data arrangement method appropriate for the architecture of the operating machine, namely, in the order of big endian, with memory boundaries being taken into account.

In this example, to arrange the operands of the GOTO instruction, offset1 and offset2, to fit in two-byte boundaries, a NOP instruction is inserted at an address of 100, immediately before the GOTO instruction, the GOTO instruction is stored at an address of 101, and the operands of the GOTO instruction are stored in two bytes at addresses of 102 and 103.

Since the operand of the LOAD instruction references index1 of the data object3, namely, the data 20 of the variable x2 having a data type of "short" (two bytes long), the operand is rewritten in two bytes. To arrange the two-byte operand to fit in two-byte boundaries, a NOP instruction is inserted at an address of 104, a LOAD_SHORT instruction is stored at an address of 105, and the operands are stored in two bytes at addresses of 106 and 107.

A LOAD_SHORT instruction does not perform a data reference in actual instruction execution and has a two-byte operand. In this example, since the operand of the LOAD instruction increases in size from one byte to two bytes, the contents at the addresses 102 and 103, which indicate the relative address of the operand of the GOTO instruction stored at the address 101, are updated.

In FIG. 5B, the data reference of the operands of instructions included in the byte-code sequence is analyzed, and the operands are rewritten in the order of little endian.

In FIG. 4 and FIGS. 5A and 5B, the data reference destinations are variables. When a data reference destination is a function, the same processing is also performed. In this case, in addition to a LOAD instruction, an instruction which needs to be changed due to operand rewriting is changed to another instruction.

As described above, in a program executing apparatus according to the present invention, when intermediate codes stored in the external storage unit 101 or those downloaded through the network 108 are read by the code reading section 102 into the storage unit 103, the data-reference analyzing section 104 determines whether the operands of instructions included in the read intermediate codes need data references, and analyzes data reference for instructions having a data reference.

The code rewriting section 105 rewrites instruction operands according to the analysis information obtained by the data-reference analyzing section 104. With a data arrangement method appropriate for the architecture of the operating machine being taken into account, such as the order of bit endian or little endian, or the use of four-byte data arrangement boundaries or two byte boundaries, intermediate codes are rewritten.

The address updating section 106 updates the addresses of address-related instructions when the operand size of the rewritten data becomes larger than the original operand size, or when the operand size becomes larger than the original operand size due to fitting in memory boundaries.

After the data-reference analyzing section 104, the code rewriting section 105, and the address updating section 106 interpret all intermediate codes, the main interpreting and executing section 107 starts interpreting and executing the intermediate codes.

It is designed that the data-reference analyzing section 104, the code rewriting section 105, and the address updating section 106 finish analyzing all data references in a period from when the code reading section 102 reads intermediate codes into the storage unit 103 to when the main interpreting and executing section 107 actually starts interpreting and executing the intermediate codes.

When the code rewriting section 105 changes the size of the intermediate codes, the address updating section 106 searches for all intermediate codes which require address updating and updates the original address by the size change.

The code rewriting section 105 rewrites the intermediate codes according to the information analyzed by the data-reference analyzing section 104, in a data arrangement method based on the machine architecture.

The main interpreting and executing section 107 accesses at a time the intermediate codes rewritten by the code rewriting section 105 in the data arrangement method based on the machine architecture, with the data length of the type of the data to be accessed.

Figure 6:
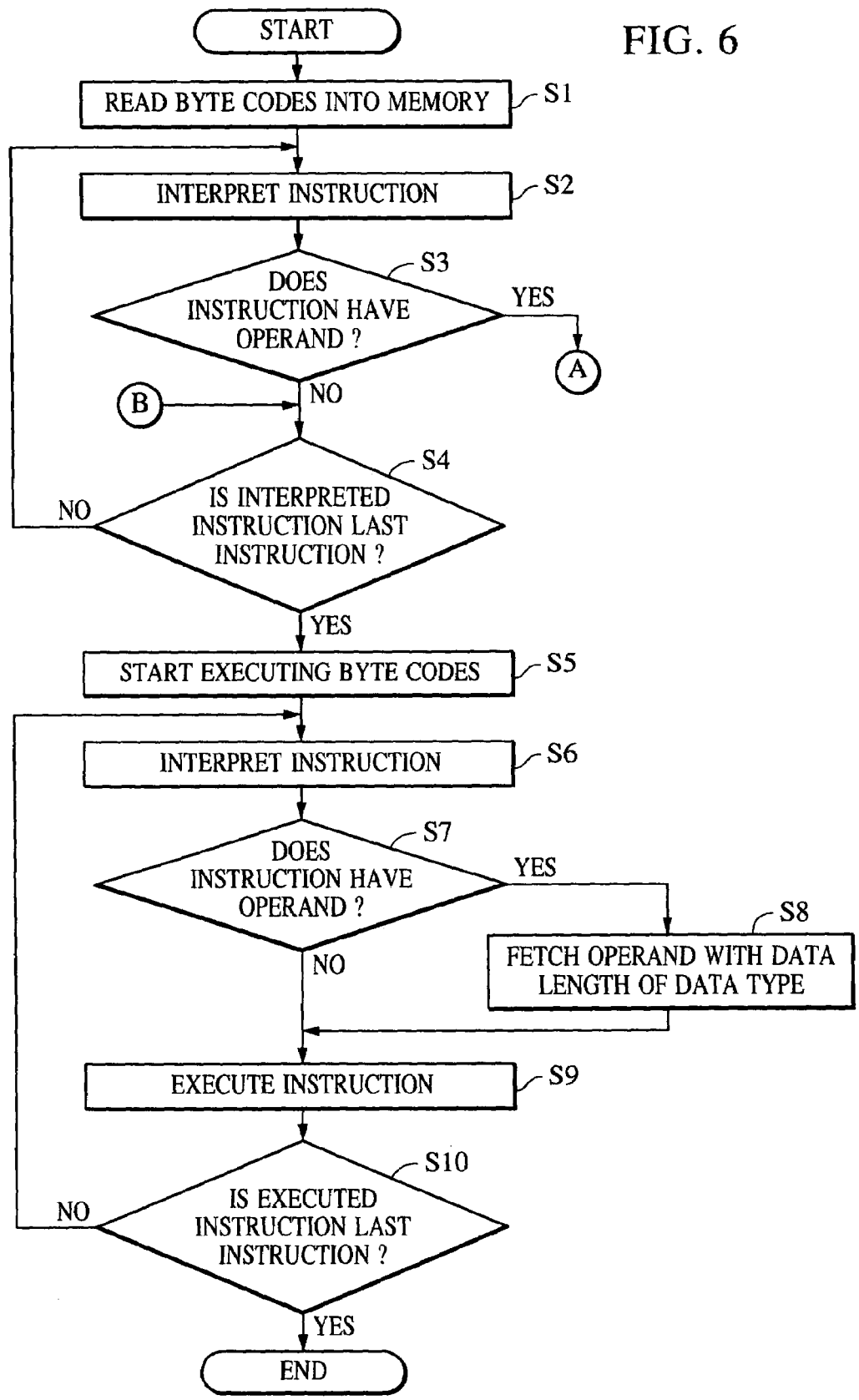
FIG. 6 is a flowchart showing a control processing procedure of the program executing apparatus.
Figure 7:
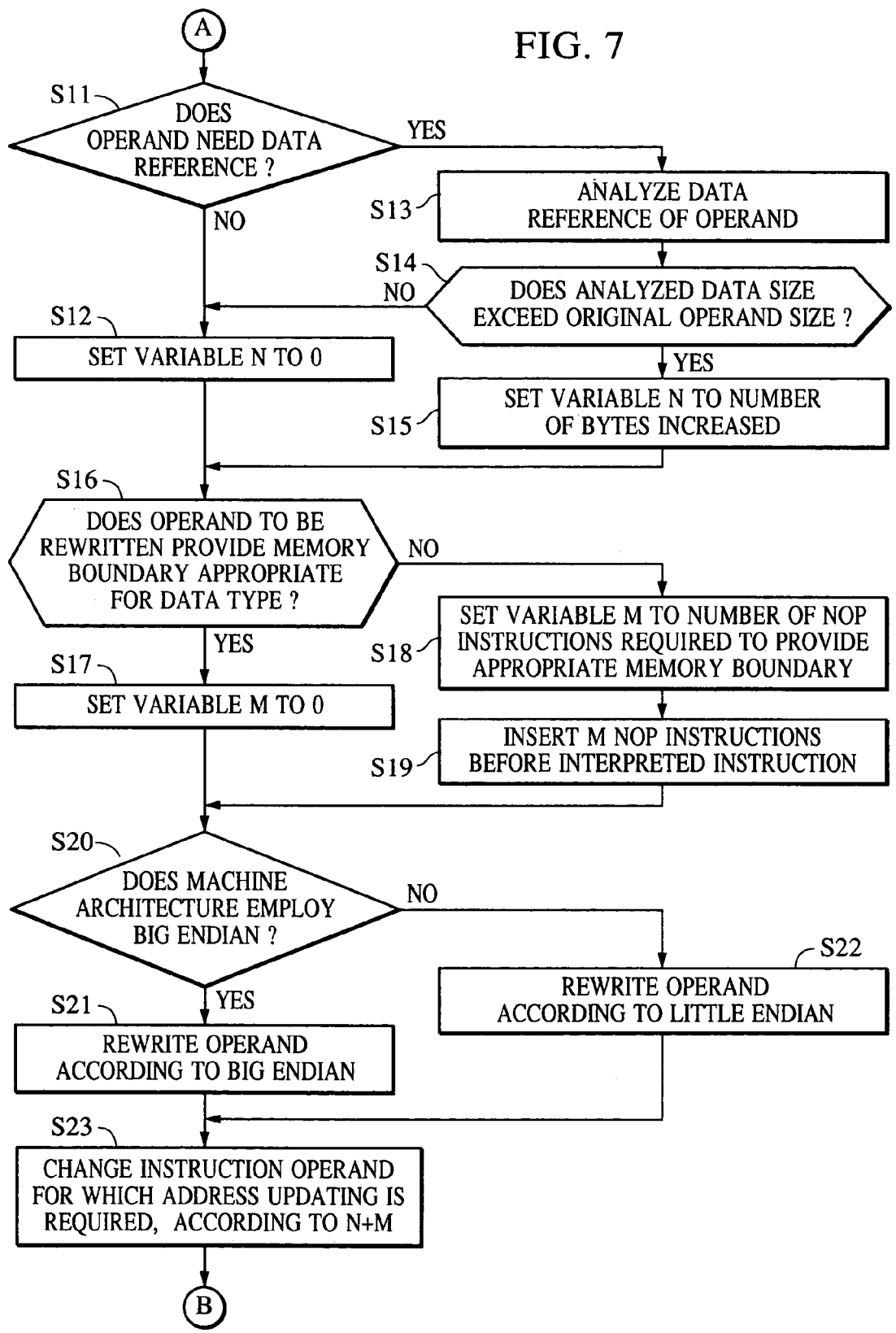
FIG. 7 is a flowchart showing a control processing procedure of the program executing apparatus, connected to that shown in FIG. 6.

FIG. 6 and FIG. 7 are flowcharts showing the control processing procedure of the program executing apparatus. The program codes of this processing program are stored in the storage unit 103. The code reading section 102, the data-reference analyzing section 104, the code rewriting section 105, the address updating section 106, and the main interpreting and executing section 107, which are implemented when the central processing unit (CPU) not shown of the program executing apparatus executes the program codes, perform the processing.

The program codes correspond to the control procedure for reading byte codes into the storage unit 103 (memory), analyzing data reference, rewriting the byte codes according to the analysis information, and interpreting and executing the rewritten byte codes one by one.

Byte codes stored in the external storage unit 101 or byte codes downloaded through the network 108 are read by the code reading section 102 into the storage unit 103 (memory) in a step S1. The code reading section 102 interprets a one-byte instruction in a step S2, and determines in a step S3 whether the instruction has an operand.

When it is determined that the instruction has an operand, whether the operand needs a data reference is determined in a step S11. When a data reference is not necessary, a variable N is set to 0 in a step S12. When a data reference is needed, the data reference of the operand is analyzed in a step S13 and whether the analyzed-data size exceeds the original operand size is determined in a step S14.

When the analyzed-data size does not exceed the original operand size, the variable N is set to 0 in the step S12. When the analyzed-data size exceeds the original operand size, the variable N is set to the number of increased bytes in a step S15.

Whether the operand to be rewritten is arranged to fit in memory boundaries appropriate for the data type is determined in a step S16. When it is arranged to fit in memory boundaries appropriate for the data type, a variable M is set to 0 in a step S17. When it is determined in the step S16 that the operand is not arranged to fit in memory boundaries appropriate for the data type, the variable M is set in a step S18 to the number of NOP instructions required to fit in appropriate memory boundaries and M NOP instructions are inserted in a step S19 before the instruction being interpreted.

Next, whether the architecture of the operating machine employs big endian or little endian is determined in a step S20. When big endian is employed, the data of the operand is rewritten according to big endian in a step S21, an instruction for which address updating is required is searched for, and the operand of the instruction is updated according to the variable N plus the variable M in a step S23. When it is determined in the step S20 that little endian is used, the data of the operand is rewritten according to little endian in a step S22, an instruction for which address updating is required is searched for, and the operand of the instruction is updated according to the variable N plus the variable M in the step S23.

After the process in the step S23, or it is determined in the step S3 that the instruction does not have an operand, whether the interpreted instruction is the last instruction is determined in a step S4. When it is determined that the interpreted instruction is not the last one, the procedure returns to the step S2 to interpret the next instruction.

When it is determined in the step S4 that the interpreted instruction is the last one, the main interpreting and executing section 107 starts interpreting and executing all rewritten byte codes one by one in a step S5.

A one-byte instruction is interpreted in a step S6, and whether the instruction has an operand is determined in a step S7. When it is determined that the instruction does not have an operand, the instruction is executed in a step S9. When it is determined in the step S7 that the instruction has an operand, since the data length of the operand to be fetched is obtained when the instruction is interpreted, the operand is fetched with the data length in a step S8, and the instruction is executed in the step S9.

Whether the executed instruction is the last instruction is determined in a step S10. When the executed instruction is not the last one, the procedure returns to the step S6 to interpret the next instruction. When it is determined that the executed instruction is the last one, one-by-one interpretation and execution of all the byte codes stored in the storage unit 103 (memory) is finished.

As described above, according to a program executing apparatus of the present embodiment, when byte codes stored in the external storage unit 101 or byte codes downloaded through the network 108 are read into the storage unit 103 (memory), since instructions including data references are all analyzed and the byte codes are rewritten in advance according to the analysis information, a data reference does not need to be analyzed every time a byte code is interpreted and executed, and thereby byte codes are executed at a high speed.

Since byte codes are rewritten according to the information of analyzed data reference with a data arrangement method appropriate for the machine architecture being taken into account, memory access is performed at a time. The number of times the memory is accessed is reduced, and thereby byte codes are executed at a high speed.

Since data references are all analyzed in advance and byte codes are rewritten according to the analysis information, a hash table for analyzing data references or a memory area for data cache is not required. The required memory capacity is reduced.

In the present embodiment, the program code group shown in FIG. 6 and FIG. 7 is stored in the storage unit 103. The program code group shown in FIG. 6 and FIG. 7 may be stored in a storage medium of the external storage unit 101 or an internal storage resource. In this case, the central processing unit (CPU) reads the program codes from the storage medium or the storage resource, and executes them.

Figure 8:
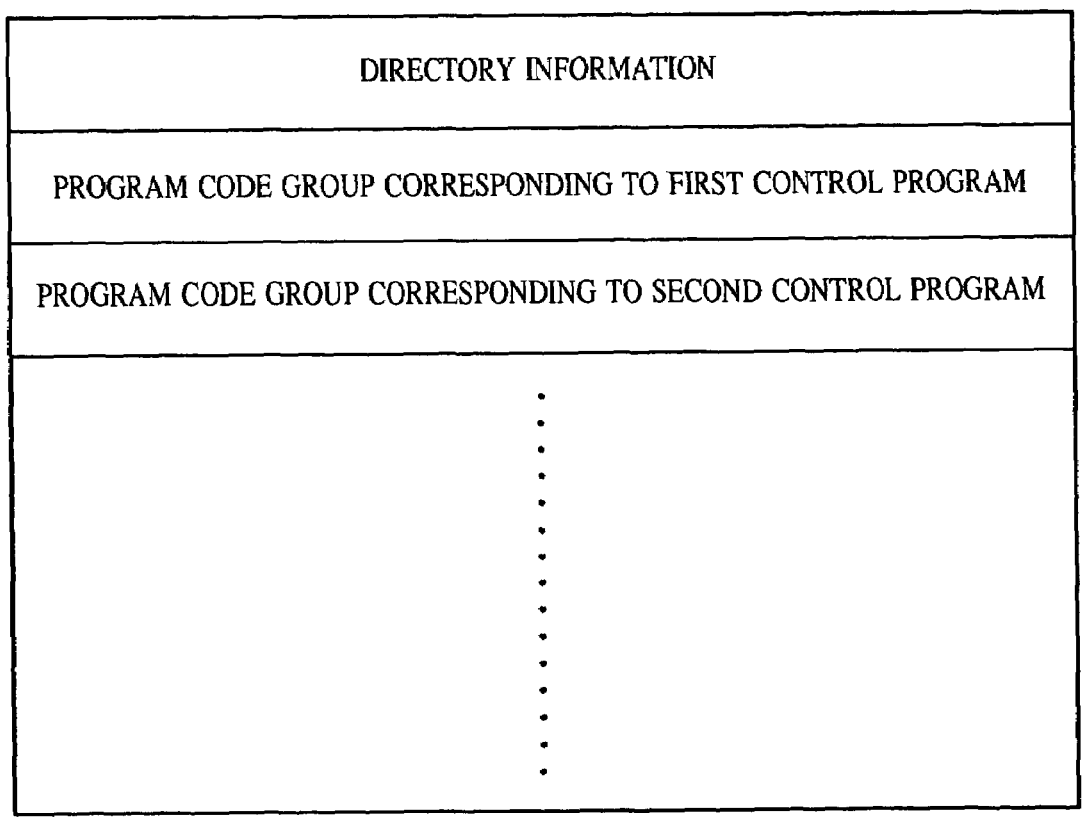
FIG. 8 is a view showing a memory map of a storage medium for storing the program code groups of various control programs which can be read by the CPU.

FIG. 8 is a view showing the memory map of a storage medium that stores the program code groups of various control programs which can be read by the CPU. In this storage medium, the program codes shown in FIG. 6 and FIG. 7, namely, the program codes related to the code reading procedure, the data-reference analyzing procedure, the code rewriting procedure, the address updating procedure, and the main interpreting and executing procedure, are stored as the program code group corresponding to a first control program. Program codes in a second embodiment described later are stored as the program code group corresponding to a second control program.

Although not shown specifically, the storage medium may store information for managing stored program groups, such as version information and creator information, and information dependent on the operating system of the program reading side, such as an icon for identifying a program.

The data belonging to various programs is also managed in the directory information. A decompression program may be stored in a case in which a program for installing various programs into the computer or a program to be installed is compressed.

The functions of the program codes shown in FIG. 8 may be implemented by the present system with a program installed from the outside. In this case, it is possible to provide the present system with an information group including a program, by the use of a storage medium such as a CD-ROM, a flash memory, or a floppy disk, or through a network from an external storage medium.

As described above, when a storage medium that stores the program codes of software which implements the functions of the present embodiment is supplied to a system or an apparatus and the computer (CPU or MPU) of the system or the apparatus reads the program codes stored in the storage medium and executes them, the objects of the present invention are also achieved.

In this case, the program codes themselves read from the storage medium implement the new functions of the present invention. The storage medium that stores the program codes constitutes the present invention.

As storage media for supplying the program codes, floppy disks, hard disks, optical disks, magneto-optical disks, DVDs, CD-ROMs, CD-Rs, magnetic tapes, nonvolatile memory cards, ROMs, and EEPROMs can be used.

The computer executes the read program codes to implement the functions of the above embodiment. In addition, the present invention also includes a case in which the operating system running on the computer performs a part or the whole of actual processing according to the instructions of the program codes and the functions of the above embodiment are implemented by the processing.

The present invention further includes a case in which program codes read from a storage medium are written into a memory provided for a function extension board inserted into the computer or a function extension unit connected to the computer, the CPU provided for the function extension board or the function extension unit performs a part or the whole of actual processing according to the instructions of the program codes, and the functions of the above embodiment are implemented by the processing.

The present invention may be applied to a system formed of a plurality of units or to an apparatus formed of one unit. A program for implementing the present invention may be downloaded and read from a database on a network by a system or an apparatus with the use of a communication program.

Second Embodiment

In the first embodiment, the data references of instructions in byte codes read by the code reading section 102 into the storage unit 103 are all analyzed in advance and rewritten, and the main interpreting and executing section 107 interprets and executes the instructions of the rewritten byte codes one by one. Even when the same byte codes are read by the code reading section 102 into the storage unit 103, their data reference is analyzed in the same way and then the instructions are executed.

In the second embodiment, the byte codes executed by the main interpreting and executing section 107 are stored in the external storage unit 101. When byte codes for which a data reference has been analyzed are read, the data reference does not need to be analyzed and therefore the byte codes are executed at a high speed.

In other words, since the byte codes do not include an instruction that requires data reference in a process in which the data-reference analyzing section 104 interprets the read byte codes, the data-reference analyzing process, a process for rewriting byte codes in the code rewriting section 105, and a process for updating addresses in the address updating section 106 become unnecessary.

In addition, since byte codes are configured in the data arrangement method based on the machine architecture, a process for changing data arrangement and a process for updating addresses become unnecessary.

As described above, according to the program executing apparatus of the second embodiment, the same hardware structure as in the first embodiment is used and the intermediate codes executed by the main interpreting and executing section 107 are stored in the external storage unit 101. When intermediate codes for which the data reference has been analyzed is read, the analysis of data reference is not required and the intermediate codes are executed at a high speed.

As described above, according to the present invention, intermediate codes are executed at a high speed. A hash table for analyzing data references or a memory area for data cache is not required and thereby the required memory capacity is reduced.

Even when the size of intermediate codes is changed due to rewriting, address updating means updates the addresses of the intermediate codes accordingly.

It is not required that each data reference be analyzed every time intermediate codes are interpreted and executed one by one.

When the size of intermediate codes is changed due to rewriting performed by code rewriting means, since all intermediate codes for which address updating is required are searched for and the original addresses are updated by the amount by which the size is changed, the addresses are correctly referenced.

Rewritten intermediate codes are accessed at a time with the data length of the type of the data to be accessed, the number of memory accesses is reduced, and thereby the intermediate codes are interpreted and executed one by one at a high speed.

What is claimed is:

1. A program executing apparatus of an interpreter type for interpreting and executing one by one intermediate codes generated by a compiler of an apparatus with a different machine architecture than said program executing apparatus, said apparatus comprising:
   code reading means for reading the intermediate codes generated by the compiler of the apparatus with a different machine architecture than said program executing apparatus into a storage unit;
   data-reference analyzing means for determining whether the intermediate codes, generated by the compiler of the apparatus with a different machine architecture than said program executing apparatus and read into the storage unit by said code reading means, need data references and, if needed, analyzing the data references of the intermediate codes read into the storage unit;
   code rewriting means for rewriting the intermediate codes, generated by the compiler of the apparatus with a different machine architecture than said program executing apparatus and processed by said data-reference analyzing means, based on a data arrangement boundary employed by said program executing apparatus;

address updating means for updating addresses of the intermediate codes generated by the compiler of the apparatus with a different machine architecture than said program executing apparatus, processed by said data-reference analyzing means and rewritten by said code rewriting means when a size of the intermediate codes becomes larger than the intermediate codes' original size due to rewriting performed by said code rewriting means; and main interpreting and executing means for, after completion of operations by said data-reference analyzing means, said code rewriting means, and said address updating means, interpreting and executing the intermediate codes one by one.

2. A program executing apparatus according to claim 1, wherein said data-reference analyzing means, said code rewriting means, and said address updating means finish analyzing all data references in a period from when said code reading means reads the intermediate codes into the storage unit to when said main interpreting and executing means actually starts interpreting and executing the intermediate codes.

3. A program executing apparatus according to claim 1, wherein, when the size of the intermediate codes is changed due to rewriting performed by said code rewriting means, said address updating means searches for intermediate codes for which address updating is required, and updates the original addresses by an amount by which the size has been changed.

4. A program executing apparatus according to claim 1, wherein, when a variable is referenced in a data reference of one of the intermediate codes, said code rewriting means rewrites the one intermediate code so as to directly reference the variable.

5. A program executing apparatus according to claim 1, wherein said main interpreting and executing means accesses one by one the rewritten intermediate codes, together with a data length of a data type to be accessed.

6. A program executing apparatus according to claim 1, further comprising executed-code storage means for storing the intermediate codes executed by said main interpreting and executing means, wherein an executed intermediate code based on a first intermediate code for which data references have been analyzed, stored in said executed-code storage means, is read when the first intermediate code is read again.

7. A control method for a program executing apparatus of an interpreter type for interpreting and executing one by one intermediate codes generated by a compiler of an apparatus with a different machine architecture than said program executing apparatus, said method comprising:

a code reading step, of reading the intermediate codes generated by the compiler of the apparatus with a different machine architecture than the program executing apparatus into a storage unit;

a data-reference analyzing step, of determining whether the intermediate codes, generated by the compiler of the apparatus with a different machine architecture than the program executing apparatus and read into the storage unit by said code reading step, need data references and, if needed, analyzing the data references of the intermediate codes read into the storage unit;

a code rewriting step, of rewriting the intermediate codes generated by the compiler of the apparatus with a different machine architecture than the program executing apparatus and processed by said data-reference analyzing step, based on a data arrangement boundary employed by the program executing apparatus;

an address updating step, of updating addresses of the intermediate codes generated by the compiler of the apparatus with a different machine architecture than the program executing apparatus, processed by said data-reference analyzing step, and rewritten by said code rewriting step when a size of the intermediate codes becomes larger than the intermediate codes' original size due to rewriting performed in said code rewriting step; and a main interpreting and executing step, of, after completion of operations in said data-reference analyzing step, said code rewriting step, and said address updating step, interpreting and executing the intermediate codes one by one.

8. A control method for a program executing apparatus according to claim 7, wherein analyzing all data references in said data-reference analyzing step, said code rewriting step, and said address updating step is finished in a period from when the intermediate codes are read into the storage unit in said code reading step to when interpreting and executing the intermediate codes are actually started in said main interpreting and executing step.

9. A control method for a program executing apparatus according to claim 7, wherein, when the size of the intermediate codes is changed due to rewriting performed in said code rewriting step, intermediate codes for which address updating is required are searched for and the original addresses are updated by an amount by which the size has been changed, in said address updating step.

10. A control method for a program executing apparatus according to claim 7, wherein, when a variable is referenced in a data reference of one of the intermediate codes, the one intermediate code is rewritten so as to directly reference the variable in said code rewriting step.

11. A control method for a program executing apparatus according to claim 7, wherein said main interpreting and executing step includes accessing one by one the rewritten intermediate codes, together with a data length of a data type to be accessed.

12. A control method for a program executing apparatus according to claim 7, further comprising an executed-code storage step, of storing executed intermediate codes generated from the intermediate codes executed in said main interpreting and executing step, wherein an executed intermediate code based on a first intermediate code for which data references have been analyzed, stored in said executed-code storage step, is read when the first intermediate code is read again.

13. A storage medium for storing program codes executed by a program executing apparatus of interpreter type for interpreting and executing one by one intermediate codes generated by a compiler of an apparatus with a different machine architecture than said program executing apparatus, said program comprising:

code for a code reading step, of reading the intermediate codes generated by the compiler of the apparatus with a different machine architecture than the program executing apparatus into a storage unit;

code for a data-reference analyzing step, of determining whether the intermediate codes, generated by the compiler of the apparatus with a different machine architecture than the program executing apparatus and read into the storage unit by said code reading step, need data references and, if needed, analyzing the data references of the intermediate codes read into the storage unit;

code for a code rewriting step, of rewriting the intermediate codes generated by the compiler of the apparatus with a different machine architecture than the program executing apparatus and processed by said data-reference analyzing step, based on a data arrangement boundary employed by the program executing apparatus;

code for an address updating step, of updating addresses of the intermediate codes generated by the compiler of the apparatus with a different machine architecture than the program executing apparatus, processed by said data-reference analyzing step, and rewritten by said code rewriting step when a size of the intermediate codes becomes larger than the intermediate codes' original size due to rewriting performed by said code for a code rewriting step; and code for a main interpreting and executing step, of, after completion of operations by said code for a data-reference analyzing step, said code for a code rewriting step, and said code for an address updating step, interpreting and executing the intermediate codes one by one.

* * * * *

UNITED STATES PATENT AND TRADEMARK OFFICE
CERTIFICATE OF CORRECTION

| | | |
|---|---|---|
| PATENT NO. | : 7,028,292 B1 | Page 1 of 1 |
| APPLICATION NO. | : 09/339250 | |
| DATED | : April 11, 2006 | |
| INVENTOR(S) | : Yasuhiro Yokota et al. | |

It is certified that error appears in the above-identified patent and that said Letters Patent is hereby corrected as shown below:

ON THE TITLE PAGE
At Item (30), Foreign Application Priority Data, "10/199727" should read --10-199727--.

COLUMN 3
Line 5, "therefore" should read --therefor--.

Signed and Sealed this

First Day of May, 2007

JON W. DUDAS
*Director of the United States Patent and Trademark Office*